(12) United States Patent
Benameur et al.

(10) Patent No.: US 9,898,272 B1
(45) Date of Patent: Feb. 20, 2018

(54) VIRTUAL LAYER ROLLBACK

(71) Applicant: Symantec Corporation, Mountain View, CA (US)

(72) Inventors: Azzedine Benameur, Fairfax, VA (US); Nathan Evans, Sterling, VA (US); Yun Shen, Bristol (GB)

(73) Assignee: Symantec Corporation, Mountain View, CA (US)

( * ) Notice: Subject to any disclaimer, the term of this patent is extended or adjusted under 35 U.S.C. 154(b) by 141 days.

(21) Appl. No.: 14/969,885

(22) Filed: Dec. 15, 2015

(51) Int. Cl.
*G06F 9/44* (2006.01)
*G06F 9/445* (2018.01)
*G06F 9/455* (2018.01)

(52) U.S. Cl.
CPC .................. *G06F 8/65* (2013.01); *G06F 8/62* (2013.01); *G06F 9/45533* (2013.01)

(58) Field of Classification Search
CPC ............. G06F 8/65; G06F 8/62; G06F 9/4553
See application file for complete search history.

(56) References Cited

U.S. PATENT DOCUMENTS

| | | | | |
|---|---|---|---|---|
| 2011/0047535 A1* | 2/2011 | Polakam | .................. | G06F 9/542 717/168 |
| 2011/0317559 A1* | 12/2011 | Kern | ........................ | H04L 45/02 370/235 |
| 2012/0115616 A1* | 5/2012 | Phillips | .................. | G07F 17/322 463/42 |
| 2012/0117555 A1* | 5/2012 | Banerjee | ................... | G06F 8/65 717/168 |
| 2012/0204173 A1* | 8/2012 | Liu | ...................... | G06F 9/44505 718/1 |
| 2012/0254867 A1* | 10/2012 | Lind | ........................ | G06F 9/466 718/1 |
| 2012/0284395 A1* | 11/2012 | Miyashita | ............ | H04L 43/0817 709/224 |
| 2012/0297374 A1* | 11/2012 | Cook | ......................... | G06F 8/67 717/169 |
| 2013/0007441 A1* | 1/2013 | Stern | ..................... | H04L 12/4641 713/100 |
| 2014/0099065 A1* | 4/2014 | Park | ........................ | H04N 5/765 386/200 |
| 2014/0159886 A1* | 6/2014 | Hasegawa | .............. | B60K 35/00 340/435 |
| 2014/0173062 A1* | 6/2014 | Lipstone | ............... | H04L 67/289 709/220 |

(Continued)

OTHER PUBLICATIONS https://support.google.com/nexus/answer/2819582?hl=en.

*Primary Examiner* — Chameli Das
(74) *Attorney, Agent, or Firm* — Holland & Hart LLP

(57) ABSTRACT

The present disclosure relates to systems and methods based at least in part on managing electronic device configuration and/or features. In some embodiments, a method may include identifying a first configuration state at a first time; generating a virtual configuration state based at least in part on the first configuration state at the first time; determining a first modification to be made to the first configuration state based at least in part on a first characteristic of a first application; modifying the virtual configuration state based at least in part on the determined first modification; and/or modifying the first configuration state at a second time after the first time based at least in part on the determined first modification.

20 Claims, 9 Drawing Sheets

(56) References Cited

U.S. PATENT DOCUMENTS

| | | | | |
|---|---|---|---|---|
| 2014/0201735 A1* | 7/2014 | Kannan | ............... | G06F 9/45558 |
| | | | | 718/1 |
| 2014/0222977 A1* | 8/2014 | Varney | .................. | H04L 67/289 |
| | | | | 709/220 |
| 2016/0366135 A1* | 12/2016 | Furuichi | ............... | H04L 41/085 |
| 2017/0192772 A1* | 7/2017 | Islam | ........................ | G06F 8/68 |

* cited by examiner

VIRTUAL LAYER ROLLBACK

BACKGROUND

As mobile devices and other computing devices continue to advance, applications and other programs adjust or change various features when each is installed and/or updated. Certain applications or other programs may make changes that a user or an administrator wants to revert once the application has been uninstalled or removed. Current system designs prohibit this rejection and do not allow a user to modify the device or programs to account for changes before the application has been installed or after it has been removed, and require complicated, manual user steps and significant time requirements.

Because of current system limitations, a need exists for a device to be able to track adjustments and/or changes for one or more specific applications and/or programs and then reject these adjustments and/or changes by reverting or rolling back. Accordingly, the present systems, methods, and techniques address these and other problems.

SUMMARY

Currently, devices employ different applications and programs. In some instances, these applications and programs want to and/or do modify certain system-based and/or application-based settings based on certain features specific to and/or used by the applications and/or the programs. For example, an application may change a user's Wi-Fi settings and/or location settings (among others) using an application programming interface (API) and/or other method, but this change may adversely affect device and/or application performance and/or may contradict a user's intentions. Because of this, other devices may employ a full backup option to return to a device configuration at an earlier time. But doing so fails to capture any after-made changes and essentially requires the user to choose between data loss and uninstalling the application.

The present systems, methods, and techniques are designed to provide a granular, specifically-designed approach to track application-related setting changes and implement certain rollback procedures and actions by using a virtual layer configuration. This virtual layer configuration tracks multiple checkpoints and facilitates rollback features when an application is updated and/or uninstalled, and/or the user initiates a rollback. This tracking leads to a focused approach to system changes and setting, increasing user satisfaction and experience, while also preventing unwanted changes related to an application (and/or another program), among other things.

Methods for managing electronic device configuration are disclosed. In some embodiments, the method may include identifying a first configuration state at a first time, generating a virtual configuration state based at least in part on the first configuration state at the first time, determining a first modification to be made to the first configuration state based at least in part on a first characteristic of a first application, modifying the virtual configuration state based at least in part on the determined first modification, and/or modifying the first configuration state at a second time after the first time based at least in part on the determined first modification.

In some embodiments, the method may further include determining a second modification to the first configuration state based at least in part on the first application. In some embodiments, the method may further include modifying the first configuration state based at least in part on the second modification.

In some embodiments, the second modification may include uninstalling the first application. In some embodiments, the second modification may include updating the first application. In some embodiments, the method may further include modifying the first configuration state based at least in part on the second modification and the original virtual configuration state or the modified virtual configuration state.

In some embodiments, modifying the virtual configuration state may include dynamically modifying the virtual configuration state based at least in part on modifying the first configuration state at the second time. In some embodiments, modifying the virtual configuration state may include statically modifying the virtual configuration state based at least in part on the first characteristic of the first application.

In some embodiments, modifying the first configuration state may include modifying a system file. In some embodiments, the first modification may include installing the first application. In some embodiments, the first modification may include updating the first application. In some embodiments, the first characteristic of the first application may include a method of the first application influencing a setting.

In some embodiments, the setting may include any of a device setting, or an application setting, or a combination thereof. In some embodiments, the setting may include any of a connectivity setting, or a localization setting, or a display setting, or an audio setting, or a storage setting, or an input setting, or a combination thereof.

Computing devices for managing electronic device configuration are disclosed. In some embodiments, devices may include a processor and memory in electronic communication with the processor, wherein the memory stores computer executable instructions that when executed by the processor cause the processor to perform certain functions and/or steps. In some embodiments, these functions and/or steps may include: identifying a first configuration state at a first time, generating a virtual configuration state based at least in part on the first configuration state at the first time, determining a first modification to be made to the first configuration state based at least in part on a first characteristic of a first application, modifying the virtual configuration state based at least in part on the determined first modification, and/or modifying the first configuration state at a second time after the first time based at least in part on the determined first modification.

In some embodiments, the instructions may include determining a second modification to the first configuration state based at least in part on the first application. In some embodiments, the instructions may include modifying the first configuration state based at least in part on the second modification. In some embodiments, modifying the virtual configuration state may include dynamically modifying the virtual configuration state based at least in part on modifying the first configuration state at the second time. In some embodiments, the first characteristic of the first application may include a method of the first application influencing a setting.

Non-transitory computer-readable storage medium storing computer executable instructions are disclosed. In some embodiments, the computer executable instructions may be executed by a processor to cause the processor to perform the steps of: identifying a first configuration state at a first time, generating a virtual configuration state based at least in part on the first configuration state at the first time, determining a first modification to be made to the first configuration state based at least in part on a first characteristic of a first application, modifying the virtual configuration state based at least in part on the determined first modification, and modifying the first configuration state at a second time after the first time based at least in part on the determined first modification.

Features from any of the above-mentioned or below-described embodiments may be used in combination with one another in accordance with the general principles described here. These and other embodiments, features, and advantages will be more fully understood upon reading the following detailed description in conjunction with the accompanying drawings and claims. The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
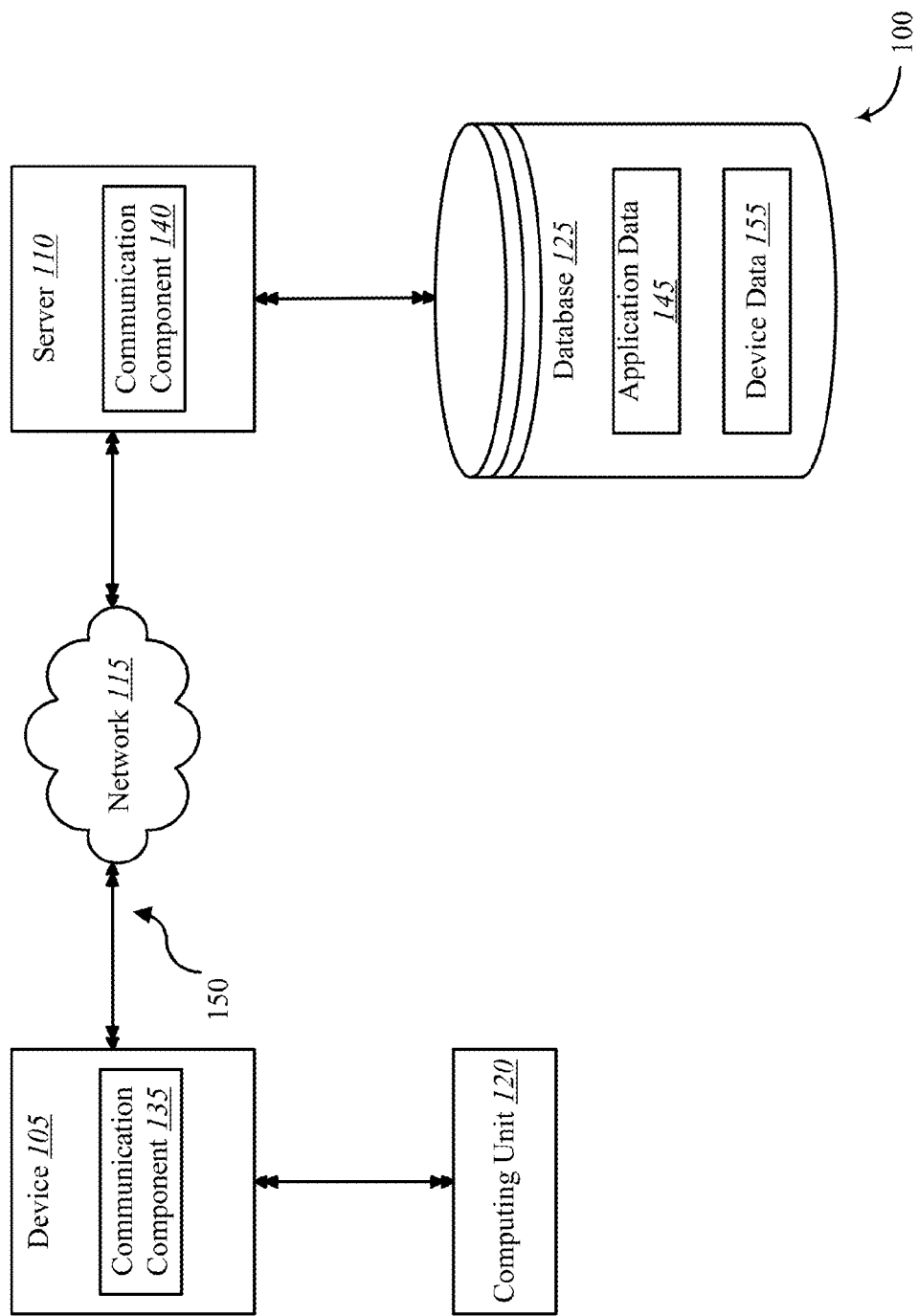
FIG. 1 is a block diagram illustrating embodiments in which the present systems and methods may be implemented, in accordance with various aspects of this disclosure.

While the embodiments described here are susceptible to various modifications and alternative forms, embodiments have been shown by way of example in the drawings and will be described in detail. However, the exemplary embodiments described here are not intended to be limited to the particular forms disclosed or to limit other forms disclosed and/or undisclosed. Rather, this disclosure covers all modifications, equivalents, and/or alternatives.

DETAILED DESCRIPTION

In some embodiments, the present systems, methods, and techniques include determining a first configuration state of a device, either for a new device or one already including one or more applications. A virtual configuration or a shadow configuration may be implemented on the device (and/or in some embodiments on another device). This virtual configuration may track a first checkpoint of the device at an initial time. Then, when an application and/or other program is installed and/or updated, the virtual configuration and/or another element of the device may determine whether the application and/or other program has, is and/or will change any system-based and/or application-based setting. A second checkpoint of the device may be recorded at a second time.

If the application and/or the program includes method relating to applying changes and/or modifications, the virtual configuration (and/or some other component and/or element of one or more devices) may hook and/or capture the change and record it as part of and/or based at least in part on the virtual configuration. When an application and/or other program is uninstalled (and/or otherwise modified), another checkpoint may be captured and/or recorded. The virtual configuration (among other components and/or elements) may initiate an action to rollback and/or revert to the earlier checkpoint, which may undo certain changes made by the application to another application (e.g., application-based settings), to system-based settings, and/or to other things. Such methods and systems provide ways to rollback application modifications and other changes to an earlier time (including those made based on the application's interrelationship with other applications and/or system settings) without a wholesale wipe of the device. This more granular approach provides distinct abilities and features, as described herein.

FIG. 1 is a block diagram illustrating embodiments in which the present systems and methods may be implemented, in accordance with various aspects of this disclosure. FIG. 1 illustrates an example of a communications system 100 in accordance with various aspects of the disclosure. The communications system 100 may include device 105, server 110, network 115, computing unit 120, and/or database 125, among other components. The network 115 may provide user authentication, encryption, access authorization, tracking, Internet Protocol (IP) connectivity, and other access, calculation, modification, and/or functions.

The device 105 may interface with the network 115 through a first set of wired and/or wireless communication links 150 to communicate with one or more local and/or remote servers 110.

The device 105 may perform communication configuration, adjustment, and/or scheduling for communication with other devices 105 and/or other components of communications system 100, or may operate under the control of a controller. In various examples, the devices 105 may communicate—either directly or indirectly (e.g., through network 115)—with each other over a second set of wired and/or wireless communication links 150. Device 105 may communicate with a back end server (such as the servers 110) directly and/or indirectly using the first set of one or more communication links 150.

The device 105 may wirelessly communicate with one or more other devices 105, servers 110, computing units 120, databases 125, and/or other components via one or more antennas. Each of the devices 105 may provide communication coverage and/or other features for an area. In some examples, devices 105 may be referred to as a control device, a base transceiver station, a radio base station, an access point, a radio transceiver, or some other suitable terminology. The communications system 100 may include devices 105 of different types. There may be overlapping geographic coverage areas for one or more different parameters, including different technologies, features, subscriber preferences, hardware, software, technology, and/or methods. For example, each device 105 may be related to one or more discrete structures (e.g., a home, a business) and each of the one more discrete structures may be related to one or more discrete areas. In other examples, multiple devices 105 may be related to the same one or more discrete structures (e.g., multiple devices relating to a home and/or a business complex).

The devices 105 may be dispersed throughout the communications system 100 and each device 105 may be stationary and/or mobile. A device 105 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A device 105 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element.

The device 105 may wirelessly communicate with one or more other components (e.g., server 110) via one or more antennas. A device 105 may be able to communicate through one or more wired and/or wireless connections with various components such as computing units, base stations, and/or network equipment (e.g., servers, wireless communication points, etc.) and/or the like.

The communication links 150 shown in communications system 100 may include uplink (UL) transmissions from one or more devices 105 to one or more servers 110 and/or one or more computing units 120, and/or downlink (DL) transmissions, from one or more servers 110 and/or one or more computing units 120 to one or more devices 105. In some embodiments, a device 105 may communicate directly and/or or indirectly with database 125 through one or more wired and/or wireless communication links. In some embodiments, one or more components may include one or more communication components (e.g., communication component 135, communication component 140, etc.). These communication components may be examples of a network interface card (NIC), among other things. Communication components may facilitate direct and/or indirect wired and/or wireless communication to receive applications, changes, configuration information, some combination, and/or other information.

The downlink transmissions may also be called forward link transmissions while the uplink transmissions may also be called reverse link transmissions. Each of the communication links 150 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 150 may transmit bidirectional communications and/or unidirectional communications. Communication links 150 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to the present systems and methods.

In some embodiments of communications system 100, devices 105 (among other components) may include one or more antennas for employing antenna diversity schemes to improve communication quality and reliability between devices 105 and/or other elements, as an example. Additionally or alternatively, devices 105 and/or servers 110 (among other components may employ multiple-input, multiple-output (MIMO) techniques that may take advantage of multi-path, mesh-type environments to transmit multiple spatial layers carrying the same or different coded data.

While the devices 105 may communicate with one or more components through one or more other components (e.g., communicate with database 125 through server 110), device 105 may also communicate directly with one or more other components via one or more direct communication links. Two or more devices 105 may also communicate via a direct communication link. Examples of direct communication links may include Wi-Fi Direct, BLUETOOTH®, wired, and/or, and other P2P group connections. The devices 105 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In some embodiments, device 105 may receive information relating to managing device configuration from one or more other sources through wired and/or wireless communication links. For example, device 105 may receive application and/or program information (among other types of information) from a computing unit 120. Device 105 may receive an application from computing unit 120 that is to be installed and/or updated on device 105. In some embodiments, device 105 and computing unit 120 may communicate directly through a wired and/or a wireless network. In other embodiments, device 105 and computing unit 120 may communicate through a network 115, for example.

In some examples, computing unit 120 may be similar to device 105. In other example, computing unit 120 may be different from device 105. A computing unit 120 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. A computing unit 120 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable component and/or element. In some examples, computing unit 120 may serve as a source for one or more applications and/or other elements for use on and/or with device 105. For example, computing unit 120 may serve as a source for an application that is pushed to and/or requested by device 105, among other things.

In some embodiments, device 105 may receive information relating to managing one or more device configurations from one or more local and/or remote servers 110, through wired and/or wireless communication links. For example, device 105 may receive application and/or program information (among other types of information) from a server 110. Device 105 may receive an application from server 110 that is to be installed and/or updated on device 105. In some embodiments, device 105 and server 110 may communicate directly through a wired and/or a wireless network. In other embodiments, device 105 and server 110 may communicate through a network 115 using communication components 135 and/or 140, for example. In some embodiments, server 110 serves as a repository for applications and/or other programs, and device 105 may request (either automatically, based on program requirements, and/or based on a user's request) to receive one or more applications and/or other programs.

Server 110 may provide the required one or more applications and/or other programs directly and/or based on queries and/or communications with database 125. Database 125 may store application data 145 (including, but not limited to, application installation parameters, application updates, uninstallation instructions, features, details, configurations, some combination, and/or other information) and/or device data 155 (including, but not limited to, device installation parameters, device updates, system information, device uninstallation instructions, features, details, configurations), some combination, and/or other information.

Figure 2:
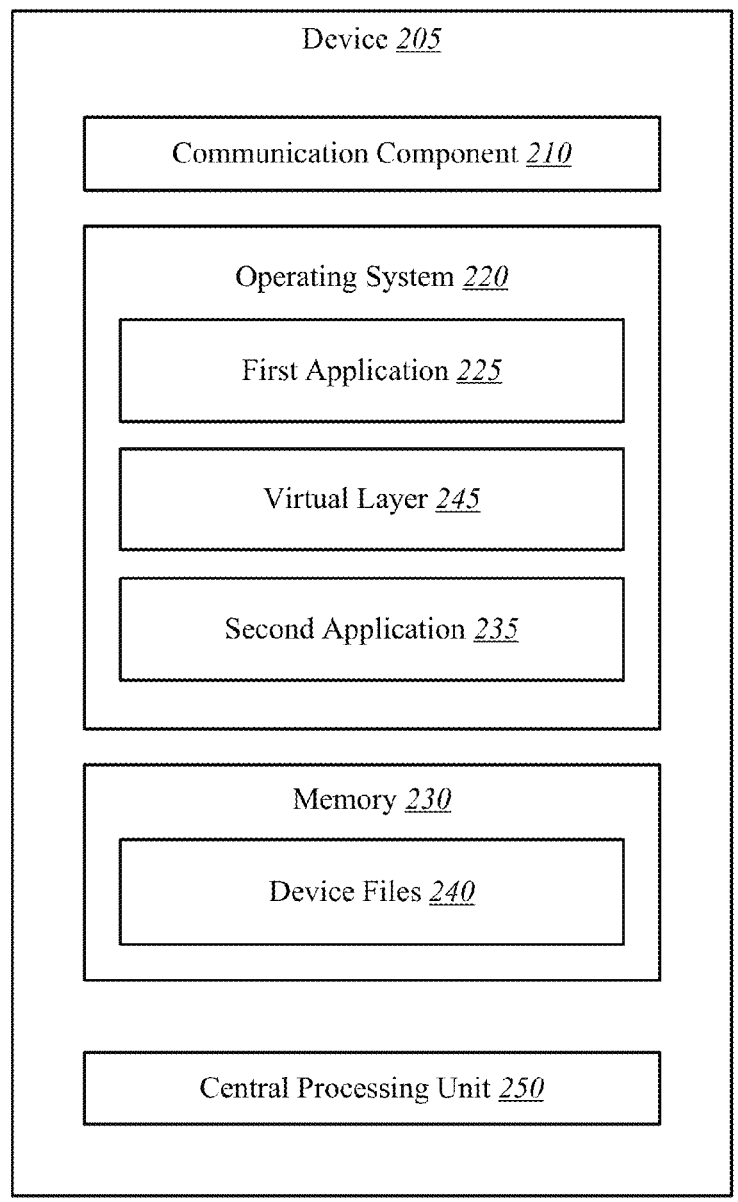
FIG. 2 is a block diagram illustrating embodiments in which the present systems and methods may be implemented, in accordance with various aspects of this disclosure.

FIG. 2 is a block diagram illustrating embodiments in which the present systems, methods, and techniques may be implemented, in accordance with various aspects of this disclosure. Device 205 may be an example of one or more aspects of a device 105 described with reference to FIG. 1, among others.

In some embodiments, device 205 may include one or more components and/or elements. For example, device 205 may include a communication component 210, operating system 220, memory 230, central processing unit 250, some combination of these, and/or other components and/or elements. Communication component 210 may be an example of one or more aspects of communication component 135 and/or communication component 140, described with reference to FIG. 1, among others. Communication component 210 may provide features and/or capabilities related to receiving application and/or other program information from one or more sources and received by device 205.

In some embodiments, device 205 may include one or more operating systems 220. These operating systems 220 may be an example of be iOS®, ANDROID®, MS-DOS®, MS-WINDOWS®, OS/2®, UNIX®, LINUX®, some combination, and/or other operating systems. Based on virtualization techniques, multiple instances of one or more operating systems may exists on device 205 in some instances, while in other instances only one operating system 220 may exist on device 205.

In some embodiments, operating system 220 may interact with and relate to first application 325 and/or virtual layer 330. In some embodiments, at a first time, device 205 may only include operating system 220 and not include first application 325. Before, at, and/or after this first time, device 205 (either alone and/or based on information from one or more other components and/or elements) may generate and/or modify virtual layer 330. In some embodiments, virtual layer 330 may include a virtual configuration file comprising one or more virtual configurations that is/are based at least in part on one or more configuration states of device 205 itself. For example, the virtual configuration may include storing a history and/or a record of one or more configuration states of device 205. In some embodiments, virtual layer 330 may be based at least in part on a partition of device 205, among other methods. In some embodiments, virtual layer 330 may be based on a hosted approach for virtualization on top of and/or related to operating system 220. In some embodiments, virtual layer 330 may be based on a hypervisor approach for virtualization related to operating system 220.

In some embodiments, first application 225 may include instructions and/or features to affect device 205, including operations system 220, device settings related to and/or stored as device files 240 in memory 230, and/or second application 235, among other elements. In some embodiments, one component of device 205, such as virtual layer 330, may determine one or more changes and/or modifications that first application 225 has made, includes instructions to make, and/or will make to system settings and/or another application's settings. One element and/or component of device 205, such as virtual layer 330, operating system 220, and/or a specific program, may hook, capture, note, and/or record these changes and/or modifications that relate. Before, during, and/or after these changes and/or modifications are hooked and/or captured, each may be determined as pertaining to one or more settings, features, and/or modifications. These settings may relate to one or more device 205 settings and/or settings pertaining to second application 235, among other settings and/or adjustments.

Virtual layer 330 may record, using a virtual configuration file (among other things), a virtual configuration accounting for the hooked setting changes, instructions, and/or modifications. This virtual configuration may mirror, track, and/or otherwise relate to one or more state configuration of device 205 itself before, during, and/or after these changes and/or modifications have been applied. In addition, as first application 225 is modified, virtual layer 245 may capture and/or record another virtual configuration after first application 225 is modified. In some embodiments, this modification may include an application update and/or an application uninstall, among other things. Virtual layer 245 may itself and/or through an interface and/or communication with another element or component of device 205 include instructions to device 205 to revert back, rollback, and/or modify a state configuration based on an earlier virtual configuration and/or an earlier state configuration (e.g., device configuration). In some embodiments, virtual layer 245 may rely on operating system 220 to coordinate and manage the state configuration of the device 205 with underlying software and/or hardware, based at least in part on the virtual configuration related to the virtual layer 330.

In some embodiments, one of ordinary skill in the art will appreciate various other aspects and/or method of virtualization can be employed in light of and in conjunction with the present systems, methods, and techniques of this disclosure, including, but not limited to, techniques and/or practices of and/or relating to operating system level virtualization, application virtualization and workspace visualization, service virtualization, memory virtualization, storage virtualization, data virtualization, network virtualization, some combination, and/or other methods.

Figure 3:
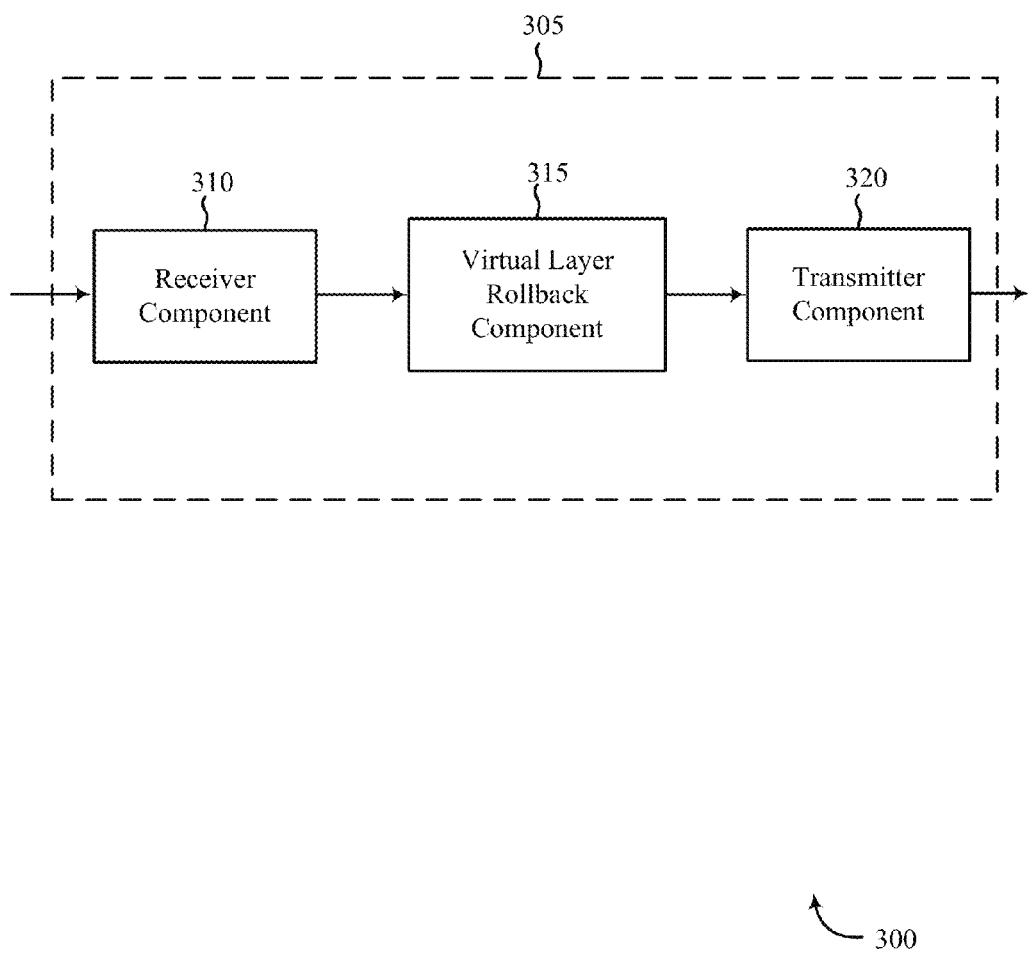
FIG. 3 is a diagram illustrating examples of devices related to the present systems and methods, in accordance with various aspects of this disclosure.

FIG. 3 shows a block diagram 300 of a device 305 for use in managing electronic device configuration, in accordance with various aspects of this disclosure. The device 305 may be an example of one or more aspects of a device 105 and/or device 205 described with reference to FIGS. 1 and/or 2, among others. The device 305 may include a receiver component 310, a virtual layer rollback component 315, and/or a transmitter component 320. Each of these components may be in communication with each other—directly and/or indirectly.

The components of the device 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

The receiver component 310 may receive information such as packets, user data, and/or control information associated with various information channels (e.g., control channels, data channels, etc.). The receiver component 310 may be configured to receive application and/or program instructions, applications, programs, information, settings, actions, data, some combination, and/or other information. Information may be passed on to the virtual layer rollback component 315, and to other components of the device 305.

In some embodiments, virtual layer rollback component 315 may receive information from receiver component 310 and/or another element of device 305 (such as those discussed with respect to FIGS. 1 and 2, among others). Virtual layer rollback component 315 may perform one or more operations relating to the present system, methods, and techniques relating to managing electronic device configuration. Virtual layer rollback component 315 may receive information relating to and/or may itself perform operations relating to one or more state configurations of device 305, virtual configurations relating to a virtual layer, changes and/or operations relating to one or more applications, programs, settings and/or other capabilities, some combination of these, and/or other techniques.

The transmitter component 320 may transmit the one or more signals received from other components of the device 205. The transmitter component 320 may transmit instructions, applications, programs, information, settings, actions, data, some combination, and/or other information to one or more other devices, servers, computing units, databases, some combination, and/or other elements and/or components. In some examples, the transmitter component 320 may be collocated with the receiver component 310 in a transceiver component.

Figure 4:
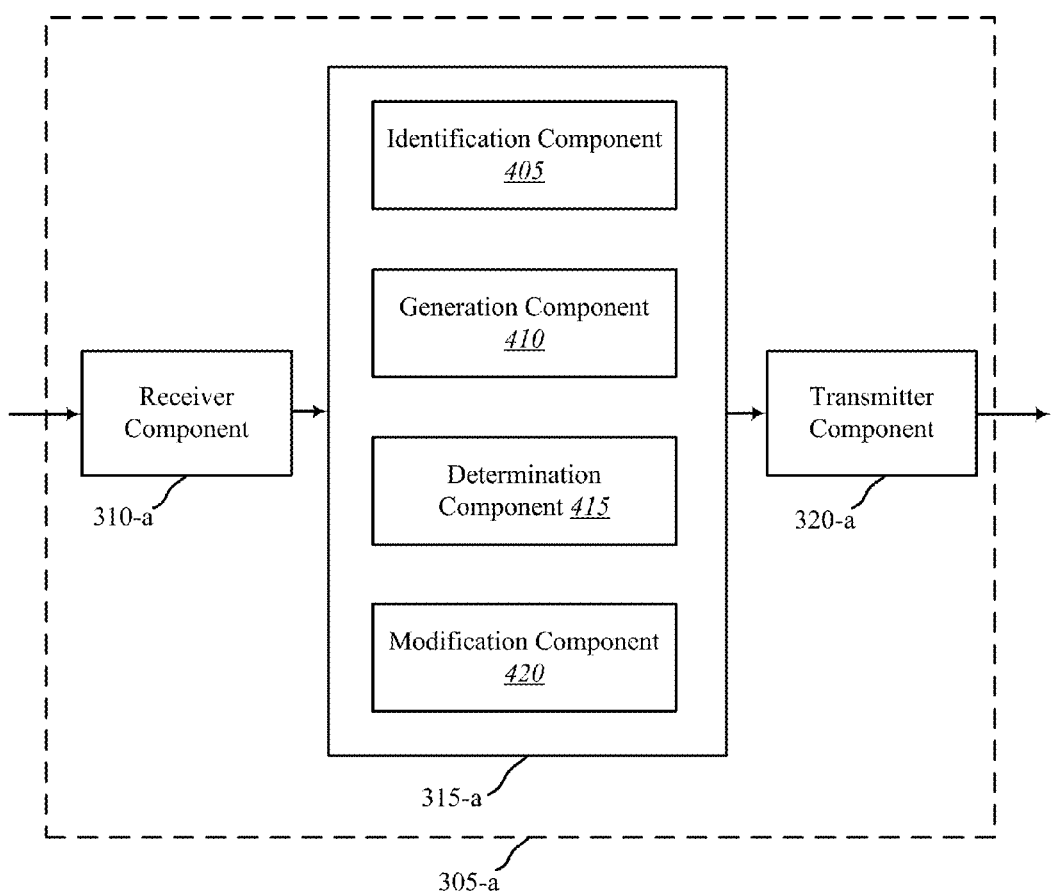
FIG. 4 is a block diagram illustrating embodiments in which the present systems and methods may be implemented, in accordance with various aspects of this disclosure.

FIG. 4 shows a block diagram 400 of a device 305-*a* for use in wireless communication, in accordance with various examples. The device 305-*a* may be an example of one or more aspects of a device 105, 205, and/or 305 described with reference to FIGS. 1-3, among others. The device 305-*a* may include a receiver component 310-*a*, a virtual layer rollback component 315-*a*, and/or a transmitter component 320-*a*, which may be examples of the corresponding components of device 305. The device 305-*a* may also include a processor. Each of these components may be in communication with each other and/or other elements. The virtual layer rollback component 315-*a* may include identification component 405, generation component 410, determination component 415, modification component 420, some combination, and/or other components relating to the present systems, methods, and techniques. The receiver component 310-*a* and the transmitter component 320-*a* may perform the functions of the receiver component 310 and the transmitter component 320, of FIG. 3, respectively.

The components of the device 305-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In some embodiments, virtual layer rollback component 315-*a* may include an identification component 405. This identification component 405 may be part of virtual layer rollback component 315-*a*, may be separate from virtual layer rollback component 315-*a*, and/or make work in conjunction with other elements and/or components of device 305-*a*, among others. Identification component 405 may perform one or more operations relating to identifying information and/or characteristics, including, but not limited to, state configurations. For example, identification component may identify a state configuration of device 305-*a* at a first time. This first time may occur when a device 305-*a* is new and/or does not have any installed applications and/or a certain number of programs, other than those required for the described techniques.

In some embodiments, this identification may identify one or more parameters and/or characteristics relating to the identified state configuration and/or applications. Examples of these parameters and/or characteristics include time, system setting categories, system setting adjustments, values, and/or positions, application setting categories, application setting adjustments, values, and/or positions, some combination, and/or other things.

In some embodiments, identification component 405 may perform one or more actions based on instructions stored in memory that cause it and/or some other element to query, scan, and/or otherwise record a state configuration of device 305-a and/or a subset and/or some part of device 305-a. Identification component 405 may identify different, similar and/or the same configuration state(s) at one or more times.

Identification component 405 may also be able to identify similarities, differences, and/or other parameters and/or characteristics of a single state configuration and/or multiple related and/or unrelated state configurations occurring at different points in time. For example, identification component 405 may identify one or more characteristics of different configuration states relating to the same one or more applications and/or may identify modifications made to an earlier state configuration based on or more actions relating to an application and/or system-based program, which may occur at a second time later than the first time and/or a third time later than the first time and/or the second time. In some embodiments, this identification may be based on one or more queries, comparisons, correlations, detections of information, referring to one or more sources of data, some combination, and/or other things.

In some embodiments, virtual layer rollback component 315-a may include a generation component 410. This generation component 410 may be part of virtual layer rollback component 315-a, may be separate from virtual layer rollback component 315-a, and/or may work in conjunction with other elements and/or components of device 305-a, among others. Generation component 410 may perform one or more operations relating to generation of one or more state configurations and/or one or more virtual configurations, among other things. For example, in accordance with various aspects of the present techniques, generation component 410 may generate a virtual configuration. In some embodiments, the virtual configuration may be based at least in part on a first state configuration of device 305-a, among other things. This virtual configuration may be contained in, recorded by, and/or captured in a virtual layer of device 305-a, among other sources.

Generation component 410 may generate a virtual configuration by recording a state configuration of device 305-a at a time and generating an identical virtual configuration. This generated virtual configuration may serve as a virtual record of the state configuration of the device 305-a at the first time. Additionally and/or alternatively, generation component 410 may generate a virtual configuration file and/or a virtual configuration by recording a state configuration of device 305-a at a time and generating a similar virtual configuration and/or a distinct virtual configuration that contains and/or related to more and/or less information, parameters, characteristics as the recorded state configuration.

In some embodiments, generation component 410 may generate files and/or subpart of files to be stored in and/or analyzed by a virtual layer. For example, generation component 410 may generate one or more virtual configuration files and/or entries within a file to capture and/or record one or more state configurations. This may, in some cases, include generating a text file (e.g., simple text file, XML, file, etc.) to capture the generated virtual configuration.

In some embodiments, virtual layer rollback component 315-a may include a determination component 415. This determination component 415 may be part of virtual layer rollback component 315-a, may be separate from virtual layer rollback component 315-a, and/or make work in conjunction with other elements and/or components of device 305-a, among others. Determination component 415 may perform one or more operations relating to determinations based at least in part on one or more state configurations and/or one or more virtual configurations, among other things. In some embodiments, this determination may be based on one or more queries, distinguishing between different information, correlations, assessments, evaluations of information, comparisons of data at one or more different times, analyzing one or more sets of information, referring to one or more sources of data of a device and/or other elements and/or components of a system, some combination, and/or other things.

In some embodiments, determination component 415 may determine whether a device (e.g., device 305-a) has performed some action in relation to a time and/or a configuration state. For example, determination component may determine that device 305-a installed a first application after a first time relating to a first configuration state. As another example, determination component may determine that device 305-a updated a first application after a first time relating to a first configuration state. Determination component 415 may determine one or more modifications relating to the first configuration state, which configuration state may occur before any modification. In some embodiments, the one or more modifications may include installing an application, updating an already-installed application, various analyses, uninstalling an applications, modifying an operating system, modifying one or more applications, some combination, and/or other actions.

In some embodiments, determination component 415 may determine one or more modifications dynamically. This dynamic determination may be based at least in part on an installed application (or other program) performing one or more operations at a runtime and/or some other time and/or times. For example, determination component may monitor characteristics of the first application, which may include changes and/or modifications initiated and/or specifically related to a first application as the application performs and/or initiates the one or more changes and/or modifications in real time (e.g., when the application initiates an action to change a connectivity and/or a localization setting). The determination component 415 many compare any change and/or modification to a list of system settings and/or application settings to determine the effect of the change and/or the modification on the device 305-a, some component and/or element of device 305-a, and/or another application present on and/or related to device 305-a. This comparison to some known settings and/or setting values allows a determination to be made about whether the modification should be hooked and/or otherwise tracked and then recorded and/or stored in a virtual configuration state.

Among other things, one or more determinations may be based on comparing a list of stored system and/or application-related settings, comparing whether an application modifies one or more settings before, during, and/or after operation, and/or comparing one or more state configurations and/or virtual configurations. In some embodiments, the characteristics of the first application may include settings and/or other information relating to audio (e.g., volume, tone), connectivity functions and/or methods (e.g., Bluetooth, Wi-Fi), localization functions and/or methods (e.g., GPS, Wi-Fi), notification functions and/or methods (e.g., alerts, sms, calls, ringtones), storage options (e.g., location of storage on internal vs. external, memory space, storage size and/or space management), language and related inputs (e.g., keyboard layout, voice to text, text to voice, dictionaries, and related features) display functions and/or methods (e.g., brightness, contrast, timing, sleep mode, security lock features, orientation), some combination, and/or other related settings, adjustments, and/or modifications.

In some embodiments, determinations may be based on an injection method. This may, in some cases, include injecting some amount of information at runtime of the application, monitoring performance of the application and the injected information, and determining a modification relating to a characteristic of the application and/or a state configuration based at least in part on this monitoring. For example, an element related to a virtual layer may monitor calls and/or requests from the applications, intercept them and hook them, store and/or save the application calls, requests, and/or some related information in the virtual configuration, and then execute the one or more calls from the application. This dynamic hooking method allows the system to accurately capture information relating to modifying a characteristic and/or an operation relating to the application.

In some embodiments, determination component 415 may determine one or more modifications statically. In some embodiments, this static determination may occur before the application executes one or more instructions to perform a modification relating to a state configuration. Static determination may include, among other things, reading one or more methods of the application and making one or more modifications. For example, the method of the application may invoke "changevolume" and the determination component may monitor and/or examine one or more methods of the application to whether the application (or another program) will impact the system settings and/or other settings relating to other applications, among other things. Based at least in part on this determination, a component of virtual layer rollback component 315 (among other elements) may modify one or more methods of the application by modifying the binary code to invoke "virtuallayer_changevolume" so that the virtual layer and/or the application is/are modified at a later time. In other embodiments, other various static modifications may be made that do not facilitate modifying binary code, but merely influence the instructions in a controlled and/or designated manner.

In some embodiments, dynamic and/or static modifications may be performed and/or relate to one or more AppWrapping techniques. For example, an AppWrapping sub-component may hook, detect, identify, and/or otherwise recognize the methods and/or the features of the application that will have an impact on the device and/or other applications. Examples of these methods may include, but are not limited to, a RingtoneManager, Wi-FiManager, LocationManager, GPS_Provider, others relating to display, communication, location-based functions, some combination, and/or other methods.

In some embodiments, modification component 420 may modify one or more state configuration and/or virtual configurations. In some embodiments, modification component 420 may modify one or more virtual configurations based at least in part on one or more determinations relating to a modification relating to the application. For example, modification component 420 may modify a virtual configuration by dynamically determining the application has, is, and/or will be adjusting one or more device and/or system settings, such as volume. Modification component may modify the virtual configuration to record and/or capture the hooked modification as a category, a binary (yes the application is modifying this feature), as a value, some combination, and/or other things. In addition, modification component 420 (and/or others components and/or elements of and/or relating to device 305-a) may modify the first state configuration and create a second state configuration incorporating the modification and differing from first state configuration. In some embodiments, this modification may include updating, rewriting, appending additional material and/or records, creating a new virtual configuration state as part of a virtual configuration file, combining one or more virtual configuration states and/or configuration states (e.g., device configuration states), some combination, and/or other operations.

Figure 5:
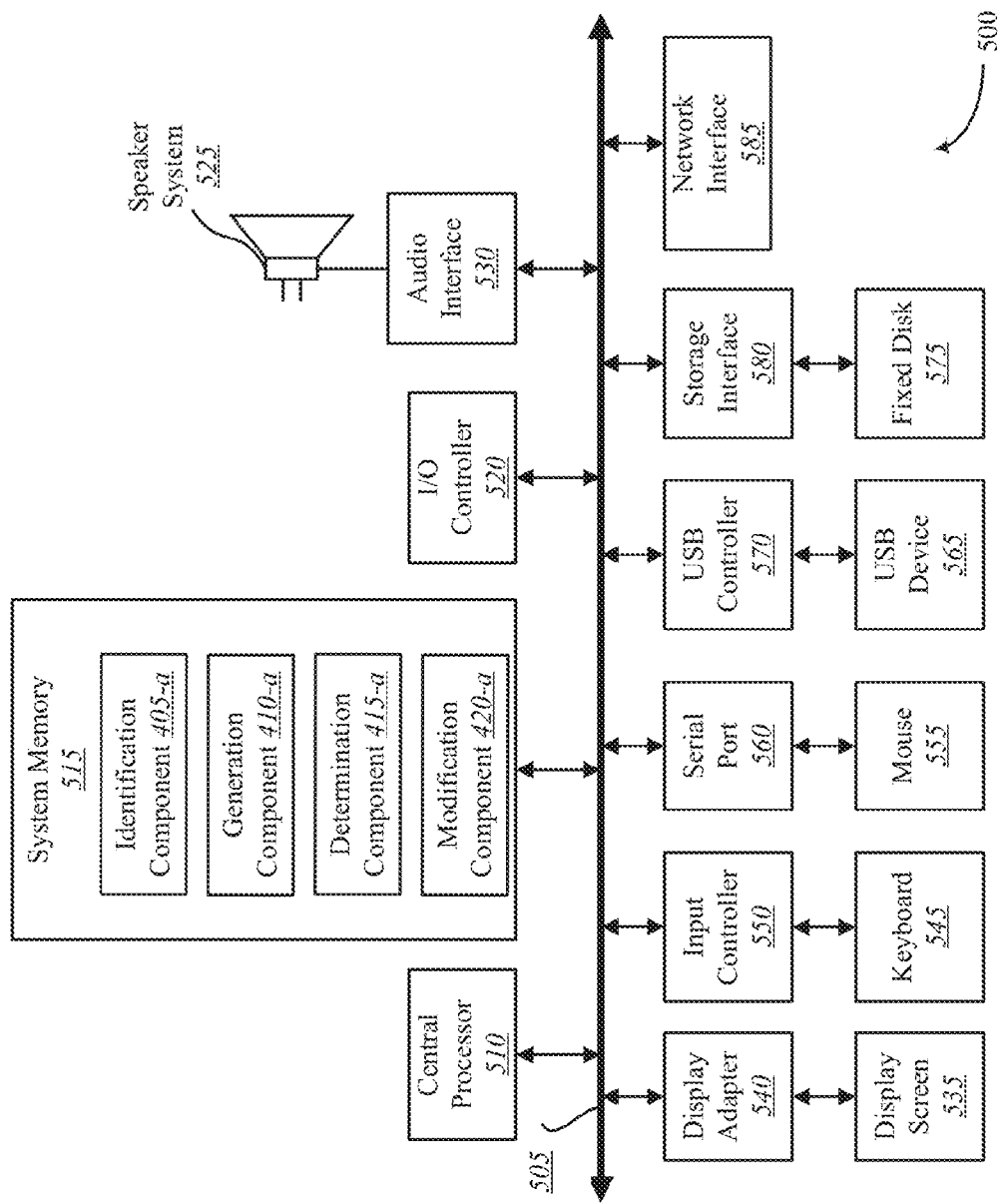
FIG. 5 is a block diagram illustrating embodiments of a system suitable for implementing embodiments of the present systems and methods, in accordance with various aspects of this disclosure.

FIG. 5 depicts a block diagram of a device controller 500 suitable for implementing the present systems and methods. The device controller 500 may be an example of a device, a server, a computing unit, and/or other units. In some embodiments, device controller 500 includes a bus 505 which interconnects components and/or elements of device controller 500 including one or more of: a central processor 510, a system memory 515 (which may include random access memory (RAM), read-only memory (ROM), flash RAM, and/or similar memory), an input/output controller 520, an external audio device, such as a speaker system 525 via an audio output interface 530, an external device, such as a display screen 535 via display adapter 540, an input device 545 (e.g., remote control device interfaced with an input controller 550), a USB device 565 (in some cases interfaced with a USB controller 570), and a storage interface 580. Also included are at least one sensor 555 connected to bus 505 through a sensor controller 560 and a network interface 585 (in some cases coupled directly to bus 505).

Bus 505 allows data communication between central processor 510, system memory 515 (which may include ROM, flash memory, RAM, and/or similar memory, as previously noted), and/or other elements. One type of memory, such as RAM, may be the main memory into which the operating system and application programs are loaded. The ROM and/or the flash memory can contain, among other code, the Basic Input-Output system (BIOS) that controls basic hardware operation such as the interaction with peripheral components or devices. For example, the different components (e.g., communication, identification, modification, generation, determination, analyses, feedback, and/or others) to implement the present systems and methods may be stored within the system memory 515. Applications resident with device controller 500 are generally stored on and accessed via a non-transitory computer readable medium, such as a hard disk drive (e.g., fixed disk 575) and/or other storage medium. Additionally, applications can be in the form of electronic signals modulated in accordance with the application and data communication technology when accessed via network interface 585.

Storage interface 580, as with the other storage interfaces of device controller 500, can connect to a standard computer readable medium for storage and/or retrieval of information—such as a fixed disk 575. Fixed disk 575 may be a part of device controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., device sensors, network sensors, system sensors, authentication sensors, communication sensors, and/or power sensors, etc.) connect to device controller 500 wirelessly via network interface 585.

Many other devices or subsystems may be connected in a similar manner (e.g., computing device, remote devices, transmitters, etc.). In addition, all of the devices shown in FIG. 5 need not be present to practice the disclosed systems and methods. The devices and subsystems can be interconnected in different ways from that shown in FIG. 5. Some aspects of some operations of a system, such as that shown in FIG. 5, may be readily known in the art and are not discussed in detail in this application.

Code to implement the present disclosure can be stored in a non-transitory computer-readable medium such as one or more of system memory 515 or fixed disk 575. The operating system(s) provided on device controller 500 may be iOS®, ANDROID®, MS-DOS®, MS-WINDOWS®, OS/2®, UNIX®, LINUX®, and/or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments may be characterized as communicated from one block to the next, other embodiments of the present systems and methods may include modified signals in place of such directly communicated signals as long as the informational and/or functional aspect of the signal is communicated between blocks. To some extent, a signal input at a second block can be conceptualized as a second signal derived from a first signal output from a first block due to physical limitations of the circuitry involved (e.g., there will inevitably be some attenuation and delay). Therefore, as used here, a second signal derived from a first signal includes the first signal and/or any modifications to the first signal—whether due to circuit limitations or due to passage through other circuit elements which do not change the informational and/or final functional aspect of the first signal.

Figure 6:
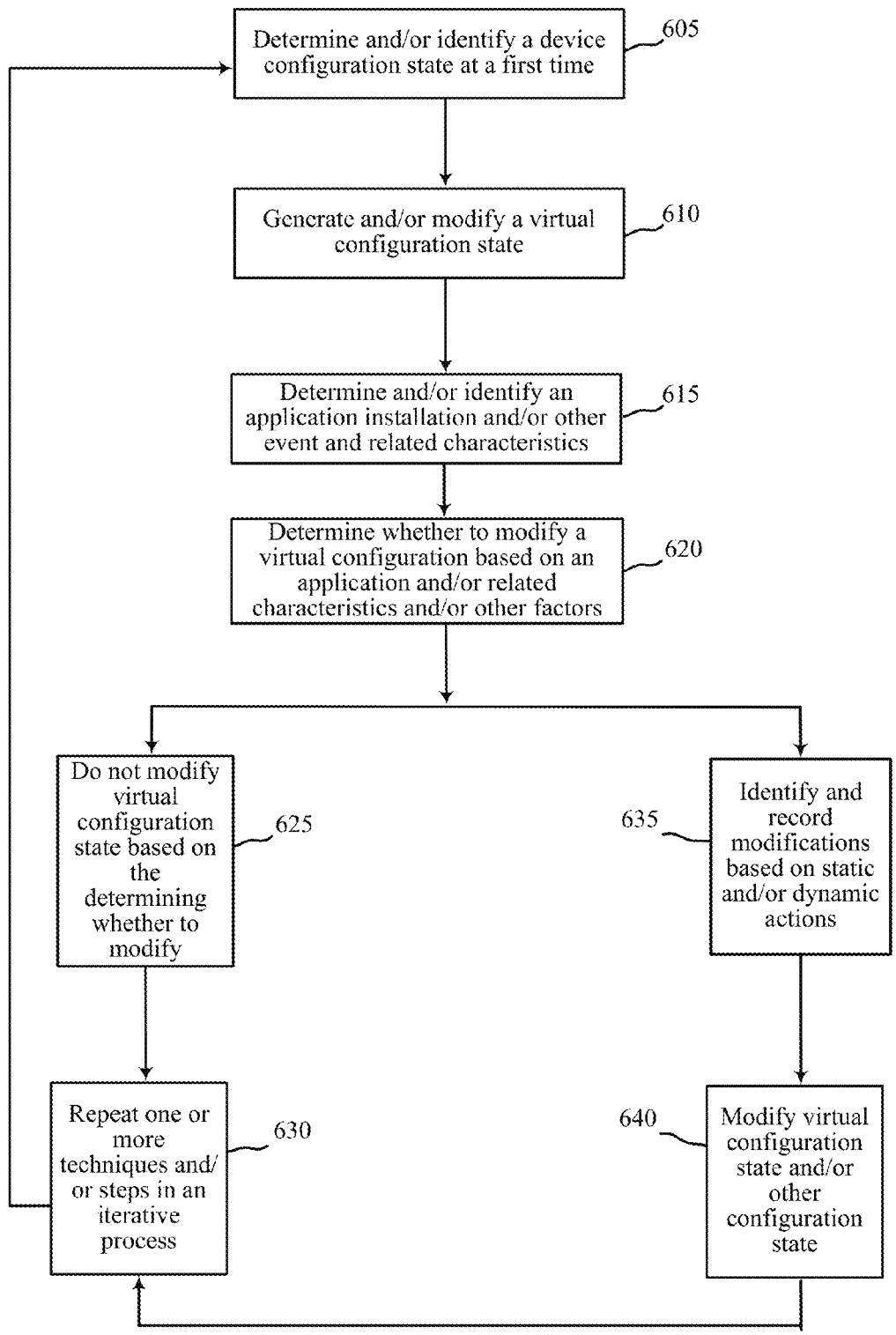
FIG. 6 is a block diagram illustrating embodiments of methods and techniques relating to managing electronic device configuration, in accordance with various aspects of this disclosure.

FIG. 6 illustrates examples of techniques for performing virtual layer rollback relating to managing device configurations, in accordance with various aspects of the disclosure. FIG. 6, among other parts of this disclosure, shows various methods, techniques, and operations. FIG. 6 is merely one example of methods that could be performed in any number of orders and/or related to any amount of information. In some cases the same and/or different components and/or elements may perform each of the techniques described in FIG. 6 and throughout this disclosure.

Block 605 illustrates that one or more elements of a device (e.g., device 305-*a*) may determine and/or identify a device configuration state at a first time. This device configuration state may be before and/or after installation of a first application on the device.

Block 610 illustrates that one or more elements of a device (e.g., device 305-*a*) may generate and/or modify a virtual configuration state. This virtual configuration state may be based on and/or relate to a virtual layer and/or a virtual layer configuration file. In some embodiments, the virtual configuration may be generated if it did not previously exist and may contain at least some information similar to and/or identical to a device configuration state. In some embodiments, the virtual configuration may be modified if it did previously exist and may contain (before and/or after the modification) at least some information similar to and/or identical to a device configuration state.

Block 615 illustrates that one or more elements of a device (e.g., device 305-*a*) may determine and/or identify an application installation and/or other event and related application characteristics. While the present techniques are not limited to determining and/or identifying an application installation, this event may be one that relates to the disclosed techniques. For example, when a device is installing a new application (e.g., because of an administrator instruction, by a user's request, and/or based on one or more other system components, elements, and/or another application), one or more elements or components (e.g., virtual layer rollback component 315-*a*) may determine and/or identify an event based on actions taken by the operating system (including requesting permission, performing reading and/or writing functions, and/or other actions) and/or another element of a device (e.g., device 305-*a*). The same and/or a different element of a device may also determine one or more characteristics of the application being and/or that has been installed. Examples of such characteristics may include methods relating to system settings, methods relating to other application(s) and related settings, operating parameters and/or requirements, necessary permissions (e.g., user permissions, software permissions, device permissions), etc.

Block 620 illustrates that one or more elements of a device (e.g., device 305-*a*) may determine whether to modify one or more virtual configurations based on an application and/or related characteristics and/or other factors. By determining whether an application may include one or more characteristics (among other things), one or more modifications (e.g., updating a virtual configuration, creating a new record within an existing virtual configuration, creating a new instance of a virtual configuration, creating a new relationship within a virtual configuration relating an application to a system setting and/or another application's setting(s), etc.) may be determined to be performed.

As block 625 illustrates, if an application (based on an installation, update, and/or other operation) will not affect one or more settings or other information relating to a configuration state and/or a virtual configuration, then the one or more elements do not modify a virtual configuration state based on the determining whether to modify.

As block 630 illustrates, one or more elements of a device (e.g., device 305-*a*) may repeat one or more techniques and/or steps in an iterative process. In some embodiments, this may include that one or more elements of a device (e.g., device 305-*a*) may determine and/or identify a device configuration state or that one or more elements of a device (e.g., device 305-*a*) may determine and/or identify an application installation and/or other event and related characteristics, among other operations. These and other steps may be repeated in subsequent actions relating to a first application and/or a second application over time to record multiple instances (if necessary) a state configuration and/or a virtual state configuration.

As block 635 illustrates, one or more elements of a device (e.g., device 305-*a*) may identify and record modifications based on static and/or dynamic actions. In some embodiments, the identifying and/or the recording may be based on dynamic techniques, which may or may not occur during, before, and/or after runtime of an application. In some embodiments, the identifying and/or the recording may be based on actions that have already occurred by determining whether certain actions relating to an application have occurred. For example, one or more elements of a device (e.g., device 305-*a*) may determine whether an application has modified a display and/or a localization characteristic and/or setting. Based at least in part on this determination, one or more elements of a device (e.g., device 305-*a*) may identify the modifications. This identification may include comparing the code and/or the executable instructions of the applications, may include identifying system changes that have occurred and were related to an application and/or one or more settings (among other things), other data and/or actions, some combination, and/or other information.

As block 640 illustrates, one or more elements of a device (e.g., device 305-*a*) may modify at least one of a virtual configuration state and/or another configuration state (e.g., device configuration state, application configuration state). In some embodiments, this modification may include modifying a configuration state record to reflect a new entry based on a modification to a system state performed by and/or related to an application. In some embodiments, this modification may include modifying a configuration state record to modify a current entry and update whether the virtual configuration reflects the changes and/or the modifications related to an application. As block 630 illustrates, after block 640 (and/or any other step) one or more elements of a device (e.g., device 305-*a*) may repeat one or more techniques and/or steps in an iterative process.

Additionally and/or alternatively, in some embodiments, other techniques may include additional and/or different actions. For example, after modifying a virtual configuration state and/or a configuration state, a technique may include determining a second modification to one or more configuration states. This second modification may be the same as, similar to, and/or different from the first modification. In some embodiments, the second modification may be uninstalling and/or updating an application relating to a device, among other things. Thus, one or more elements may determine that an application will be and/or has been uninstalled (locally, remotely, and/or otherwise) from a device and/or a server.

Based at least in part on the determining that an application will be and/or has been uninstalled (and/or one or more other second modifications to the configuration state) through a comparison, a correlation, and/or some other method, an element relating to device (e.g., virtual layer rollback component 315-*a*) may initiate and/or perform a modification of the first configuration state based at least in part on the determining. In some embodiments, this second modification may include modifying the first configuration state to match one or more virtual configuration states.

For example, the virtual configuration states may include a first virtual configuration state relating to a first state configuration before an application was installed and a second state configuration after an application was installed (and may be based on hooking the methods of the application that would modify one or more settings and/or other parameters). Then, modifying the first configuration state may include modifying the first configuration state to match the first virtual configuration state that captured one or more settings before the application was installed on the device.

This modification may be based on the second modification, which may include uninstalling an application, among other things. This provides for granular modification of one or more configuration states using the virtual layer and one or more virtual configuration states to counteract any changes and/or modifications made by and/or relating to one or more applications. Additionally and/or alternatively, this modifying the first configuration state may be based at least in part on the second modification and/or an original virtual configuration (e.g., before an application and/or an element of the device modified the state configuration) and/or the modified virtual configuration state.

In some embodiments, modifying the virtual configuration state may include dynamically modifying the virtual configuration state based at least in part on modifying the first configuration state at the second time. This modification may be based on one or more characteristics and/or actions performed and/or being performed by or on the device and/or an application on and/or relating to the device before, at, and/or during, and/or after the second time.

In some embodiments, modifying the virtual configuration state may include statically modifying the virtual configuration state based at least in part on one or more characteristics of the device and/or one or more applications, among other things. This modification may be based at least in part on detecting, identifying, and/or determining an executable code, one or more features, actions taken by the device and/or application over a period, a feature listing, a comparison of actions to information stored and/or compiled in the virtual layer and/or virtual configuration states, some combination, and/or other information.

In some embodiments, one or more virtual configuration states may record actions taken by a first application in relation to one or more device settings and/or one or more second application settings, capabilities, and/or features, among other things. In some embodiments, one or more virtual configuration states may record the actions taken by a first application related to one or more device settings and one more different virtual configuration states may track and/or record the actions taken by the first application related to one or more second applications. Tracking how one or more first application interacts with, modifies, and/or otherwise affects one or more second applications allows for additional granularity and/or modification.

For example, even when a first application may be updated and/or uninstalled (among other functions), the first application may have changed and/or affected other second applications. By tracking the influence and/or effects of the first application in relation to one or more second applications (including, for example, tracking which settings each application changed, influence, modified and/or otherwise affected), the present systems, methods, and techniques may allow for an additional modification of a state configuration based on the virtual configuration state that tracked the first applications actions relating to the second application. This allows for additional modification of a state configuration to partially and/or entirely modify all changes and/or other effects from the first application when uninstalled, updated, and/or otherwise adjusted.

Additionally and/or alternatively, in some embodiments, modifying a configuration state (e.g., a device configuration state) and/or a virtual configuration state may be based at least in part on determining whether a modification should be retained or should be rolled back. Example, may include, among other things, determining whether a superseding modification and/or intermediate modification occurred. A superseding modification may be based on a chain of priority given to different modifications relating to one or more device and/or application settings. For example, an application modification that changed a device setting may be ranked lower than a user-based modification that changed a device setting. Each user-based modification may also be hooked and/or captured (as described in this disclosure) and recorded in one or more virtual configuration files by detecting whether the system setting was modified from a first setting to a second setting and whether such modification was performed manually and/or whether it was based on a user response to one or more queries, among other things.

In some embodiments, this ranking and/or determination of superseding actions may be based on a pre-programmed list, a user-defined list, learned behavior of a user and/or other application over time (e.g., past actions that can be captured and/or otherwise stored in a virtual configuration file, some combination, and/or one or more other bases). Likewise, in some embodiments, if one or more user-approved and/or otherwise-approved applications made one or more changes, these changes may be given priority and/or supersede any rollback based on an earlier captured state configuration recorded and/or logged in a virtual configuration state. In this way, such superseding and/or priority changes may be kept and a more sophisticated system allows for more intelligent and more sophisticated rollbacks to earlier checkpoints that may still prevent unwanted changes from rogue applications but may keep certain changes that the system has determined as superseding the rollback.

In addition, in some cases a user may be queried as to which intermediate virtual configuration the state configuration should be rolled back to when multiple virtual configuration states exist. This query system may allow a user to choose between her own (or another user's actions), one or more application-related modifications and/or configurations, and/or an earlier captured virtual state configuration that may not account for all system changes beyond a certain point. In some embodiments, this query may provide a notification and/or a recommendation to the user about differences between two or more virtual configuration states, based at least in part on comparing one or more categorical-based and/or value-based differences in related to different application and/or system state data sets, among other things.

In some embodiments, modifying a first configuration state and/or a virtual configuration state may be based at least in part on a determined modification. This determined modification may be based at least in part on a first characteristic of an application. This characteristic, among others, may include an elapsed time since the application (and/or other information relating to a device) has been installed, updated, modified, and/or otherwise changed. For example, a determined modification may be based on one day and/or one week since an application was installed on and/or updated on a device. The first configuration state and/or the virtual configuration state may be updated based on a predetermined period to effectively hook, capture, and/or otherwise record system changes and/or modifications at discrete intervals.

In some embodiments, the present systems, methods, and/or techniques may be implemented using a dedicated application that interfaces with a virtual layer and/or a virtual layer rollback component 315-*a*, among other components. In other embodiments, the present systems, methods, and/or techniques may be implemented as part of an operating system using virtualization technology to create one or more virtual configuration states to record methods of influencing one or more setting and providing for rollback to diminish adverse effects of an application and/or its related setting and other adjustments.

Figure 7:
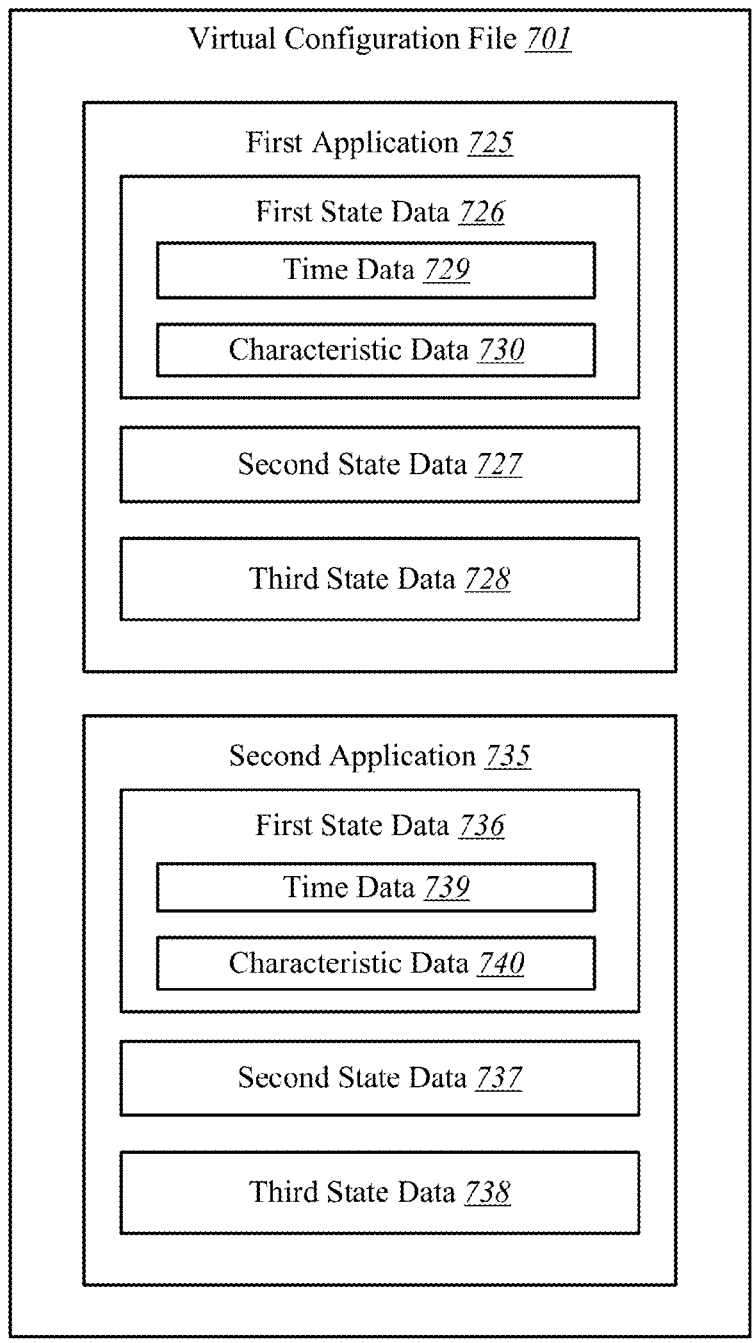
FIG. 7 is a block diagram illustrating embodiments in which the present systems and methods may be implemented, in accordance with various aspects of this disclosure.

FIG. 7 is an example of information relating to a virtual configuration 700 based at least in part on the present systems, methods, and techniques, in accordance with various aspects of this disclosure. In some embodiments, a virtual configuration may include one or more virtual configuration files 701. In some embodiments, a virtual configuration may include one virtual configuration file 701 that stores various instances and data sets relating to one or more applications, times, and/or data, some combination, and/or other information. In some embodiments, a virtual configuration may include more than virtual configuration file 701 that stores two or more instances and/or data sets relating to one or more applications, times, and/or data, some combination, and/or other information.

In some embodiments, each virtual configuration file 701 may be and/or include one or more data storing formats. For example, the format may include a text-based storage file, an object-based storage file, an image-based storage file, some combination, and/or other formats. In some embodiments, virtual configuration file 701 may include a text file, that may include one or more different information and/or organization types. These different types may include a simple text file and/or an Extensible Markup Language (XML) file, among other examples. In some embodiments, using a simple text file may allow for easy storage of the information and smaller storage requirements. In some embodiments, using an XML, or similar type file may allow for easy access and processing because of the virtual configuration information may be organized in a tree-like manner to increase speed, access, query results, and/or may provide other advantages.

In some embodiments, elements of virtual configuration file 701 may be organized by some feature and/or information of and one or more device state configurations. In some embodiments, elements of virtual configuration file 701 may be organized by one or more applications to which the elements relate and/or may be sub-organized chronologically within the framework relating to one or more applications. For example, first state data 726, second state data 727, and/or third state data 728 may relate to first application 725, while first state data 736, second state data 737, and/or third state data 738 may relate to second application 735. In some embodiments, the features and techniques relating first state data 726, second state data 727, and/or third state data 728 of first application 725 also apply to first state data 736, second state data 737, and/or third state data 738 of second application 735.

Some and/or all of first state data 726, second state data 727, and/or third state data 728 may relate to a first application and first state data 726, second state data 727, and/or third state data 728 may each include state data relating to the first application 725 that was captured at first, second, and/or third times, respectively. In alternative embodiments, at least some of first state data 726, second state data 727, and/or third state data 728 may relate to one time and/or overlapping time periods. The present techniques also envision using more state data configurations (e.g., fourth state data) relating to state date specific to one device and/or element of a device and/or multiple devices.

In some embodiments, elements of virtual configuration file 701 may be organized by one or more applications to which the elements relate. This may include organizing state data relating to device state configurations, a primary application (e.g., first application 725), a secondary application (e.g., second application 735), some combination, and/or other elements and/or components. In some embodiments, a primary application may include an application that is the subject of and/or the focus of the state data (i.e., the state data includes at least a record of one or more states of the application). In some embodiments, a secondary application may include an application that is not the subject of the state data, but is related through an interdependency, feature, reliance, and/or other reliance on a primary application (i.e., the state data includes at least a record of one or more states of the primary application that captures and/or records the relationship and/or other correlation of the secondary application to the first application, among others).

In some embodiments, first state data 726 may include time data 729. Time data 729 may relate to the time of one or more state configurations were started to and/or finished being hooked, completed, recorded, modified, some combination, and/or other information. In some embodiments, this time data may include one or more absolute days and times (e.g., Aug. 30, 2015 at 2:37 p.m.) and/or one or more relative days and times measured from one or more checkpoints (e.g., second state data 727 may include time data relative to time data 729 of first state data 726, such as 12 days 8 hours 4 minutes and 2 seconds elapsed between first state data 726 and second state data 727).

In some embodiments, first state data 726 may include characteristic data 730. Characteristic data 730 may relate to one or more stored characteristic categories, values, relative measures, and/or combinations of these (among other information) relating to a first application 725. In some embodiments, the one or more characteristics may relate to system settings, device settings (e.g., device 305-*a* settings), application settings (e.g., settings relating to first application 725, settings relating to second application 735, some combination, other applications). In some embodiments, settings may include, but are not limited to, audio (e.g., volume, tone), connectivity functions and/or methods (e.g., Bluetooth, Wi-Fi), localization functions and/or methods (e.g., GPS, Wi-Fi, relating to the person and/or device itself, relating to when and/or where pictures and/or messages were sent, taken and/or received), notification functions and/or methods (e.g., alerts, sms/text messaging, instant messaging, calls, ringtones), storage options (e.g., location of storage on internal vs. external, memory space, storage size and/or space management), language and related inputs (e.g., keyboard layout, voice to text, text to voice, dictionaries, and related features) display functions and/or methods (e.g., brightness, contrast, timing, sleep mode, security lock and/or access features, orientation), modes (e.g., airplane mode, low power mode, maximum performance), hotspot capabilities, VPN capabilities, notification settings (e.g., frequency, form, battery and/or power consumption preferences, some combination, and/or other related settings, adjustments, and/or modifications.

In some embodiments, these categories and/or other data types may be static and may be set based on device and/or system settings that are not likely to change and/or standard application-related settings that may broadly apply to most applications. In other embodiments, these categories and/or other data types may be dynamic and update based on new device and/or system settings that change based on an update (including updates relating to an operating system) and/or one or more updated application-related settings that may apply to certain applications.

In some embodiments, one or more of these settings may relate to a device setting (e.g., device 305-*a*), an application setting relating to application installed on, hosted by, used on, and/or otherwise related to a device (e.g., device 305-*a*), an operating system setting relating to application installed on, hosted by, used on, and/or otherwise related to a device (e.g., device 305-*a*), a server, a database, a computing unit, some combination, and/or other program and/or other elements and/or components of a system and/or a device.

In some embodiments, elements of virtual configuration file 701 may be organized by one or more times to which the state configurations relate (e.g., using a chronological and/or history tracking). For example, instances of state data (e.g., first state data 726, second state data 727, and/or third state data 728) may be organized based on time and irrespective of the application (e.g., first application 725, second application 735) to which each state data set may relate. Additionally and/or alternatively, state data may be organized based at least in part on time and the application to which the state data relates. In some embodiments, one or more elements of the virtual configuration file may reflect configuration states (e.g., device configuration states, system configuration states), application installations/uninstallations, device and/or application updates and/or modifications, operating system updates, etc.

Figure 8:
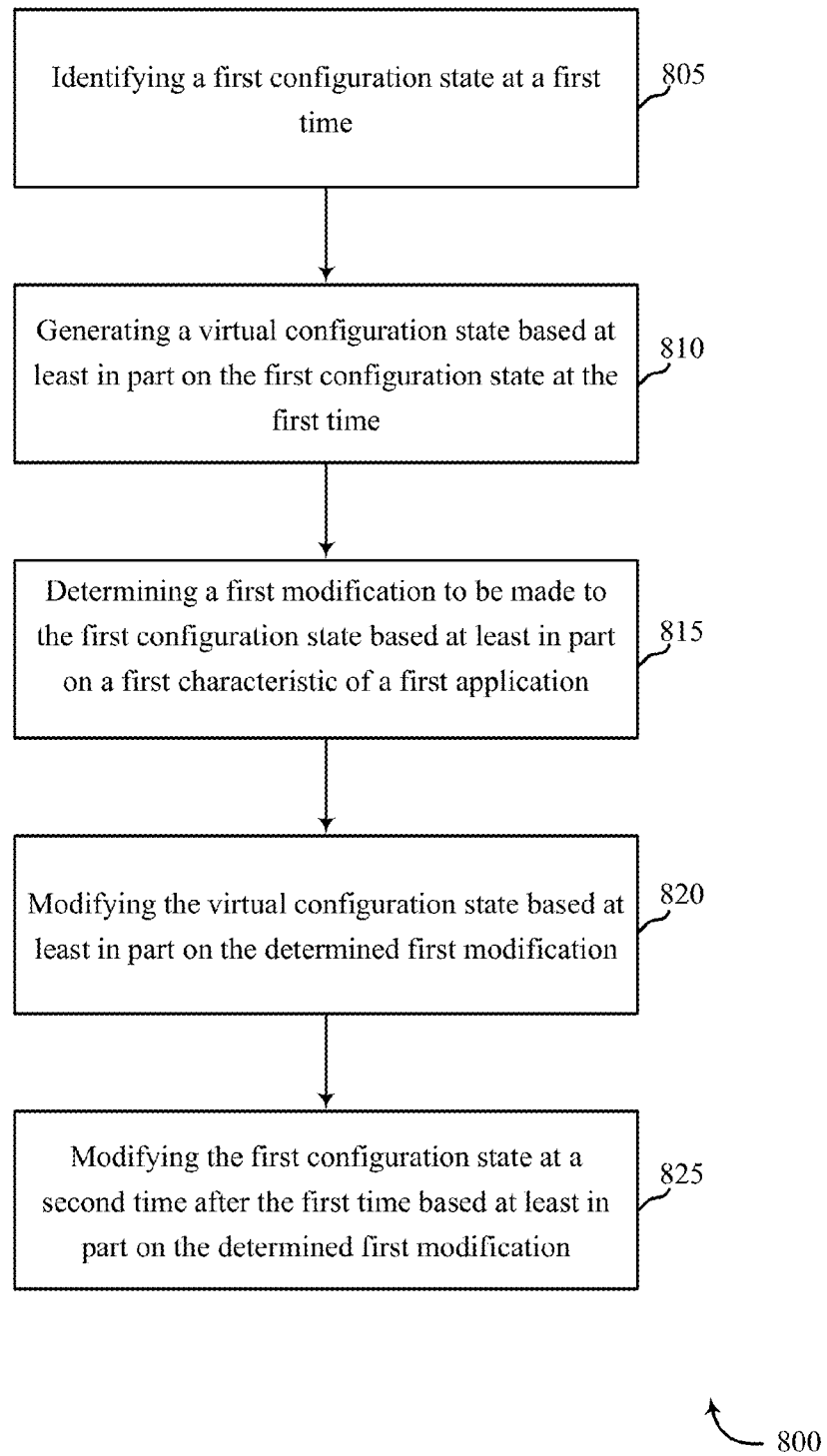
FIG. 8 is a block diagram illustrating embodiments of methods and techniques relating to managing electronic device configuration, in accordance with various aspects of this disclosure.

FIG. 8 is a flow chart illustrating an example of a method 800 for managing electronic device configurations using a virtual layer for rollback, in accordance with various aspects of the present disclosure. For clarity, the method 800 is described below with reference to aspects of one or more of the device 305 and/or device 305-*a* described with reference to FIGS. 3 and 4 (among others), and/or aspects of one or more of the virtual layer rollback components 315 and 315-*a* (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 805, the method 800 may include identifying a first configuration state at a first time. At block 810, the method 800 may include generating a virtual configuration state based at least in part on the first configuration state at the first time. At block 815, the method 800 may include determining a first modification to be made to the first configuration state based at least in part on a first characteristic of a first application. At block 820, the method 800 may include modifying the virtual configuration state based at least in part on the determined first modification. At block 825, the method 800 may include modifying the first configuration state at a second time after the first time based at least in part on the determined first modification.

In some embodiments, the operations at each of blocks 805-825 may be performed using the virtual layer rollback component 315 and/or 315-*a* described with reference to FIGS. 3 and 4, among others.

Thus, the method 800 may provide for managing electronic device configurations using a virtual layer for rollback relating to one or more devices and/or applications. It should be noted that the method 800 is just one implementation and that the operations of the method 800 may be rearranged, omitted, and/or otherwise modified such that other implementations are possible.

Figure 9:
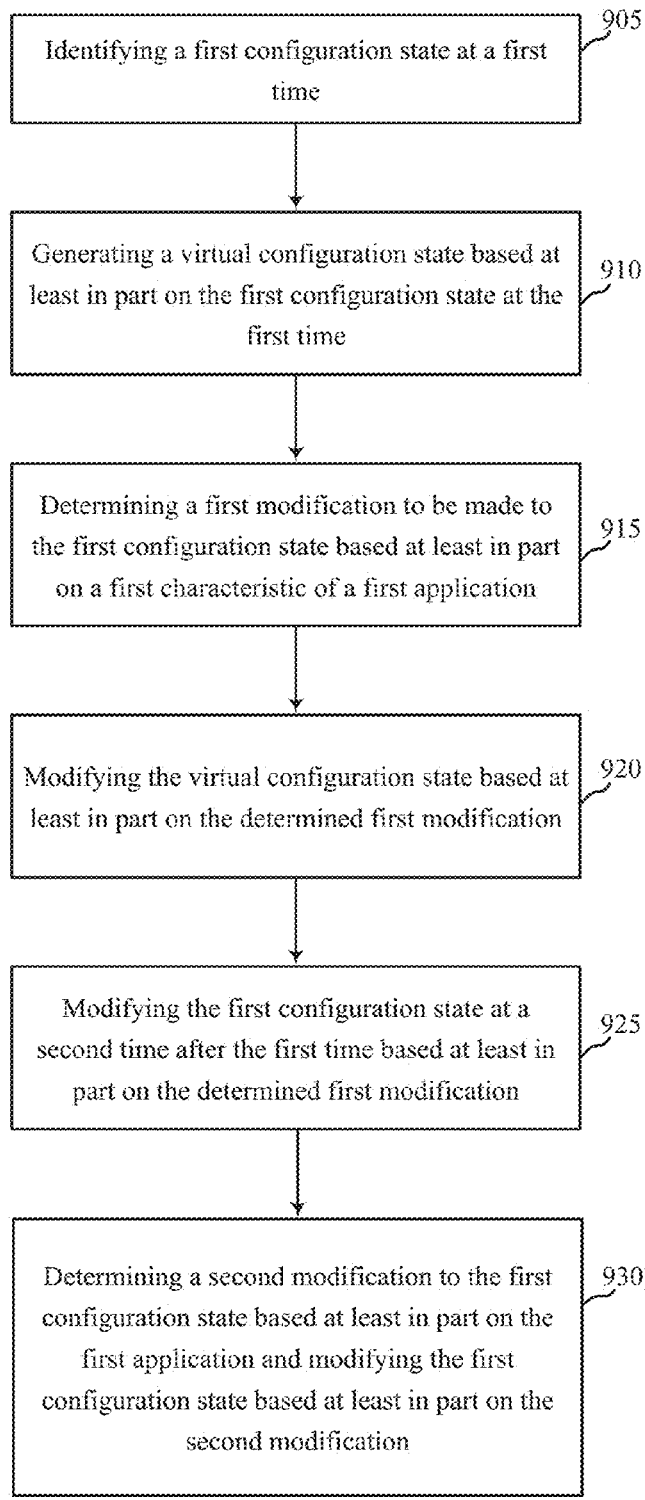
FIG. 9 is a block diagram illustrating embodiments of methods and techniques relating to managing electronic device configuration, in accordance with various aspects of this disclosure.

FIG. 9 is a flow chart illustrating an example of a method 900 for managing electronic device configurations using a virtual layer for rollback, in accordance with various aspects of the present disclosure. For clarity, the method 900 is described below with reference to aspects of one or more of the device 305 and/or device 305-*a* described with reference to FIGS. 3 and 4 (among others), and/or aspects of one or more of the virtual layer rollback components 315 and 315-*a* (among others) described with reference to FIGS. 3 and 4. In some embodiments, a device may execute one or more sets of codes to control the functional elements of the device to perform the functions described below. Additionally or alternatively, a server, a device, and/or a computing unit may perform one or more of the functions described below using special-purpose hardware.

At block 905, the method 900 may include identifying a first configuration state at a first time. At block 910, the method 900 may include generating a virtual configuration state based at least in part on the first configuration state at the first time. At block 915, the method 900 may include determining a first modification to be made to the first configuration state based at least in part on a first characteristic of a first application. At block 920, the method 900 may include modifying the virtual configuration state based at least in part on the determined first modification. At block 925, the method 900 may include modifying the first configuration state at a second time after the first time based at least in part on the determined first modification. At block 930, the method 900 may include determining a second modification to the first configuration state based at least in part on the first application and/or modifying the first configuration state based at least in part on the second modification.

In some embodiments, the operations at each of blocks 905-930 may be performed using the virtual layer rollback component 315 and/or 315-a described with reference to FIGS. 3 and 4, among others.

Thus, the method 900 may provide for managing electronic device configurations using a virtual layer for rollback relating to one or more devices and/or applications. It should be noted that the method 900 is just one implementation and that the operations of the method 900 may be rearranged, omitted, and/or otherwise modified such that other implementations are possible.

In some examples, aspects from two or more of the methods 600, 800, and 900 (among others) may be combined and/or separated. It should be noted that the methods 600, 800, 900, etc. are just example implementations, and that the operations of the methods 600, 800, 900, etc. may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for managing electronic device configuration, comprising:
   identifying a first configuration state of a computing device at a first time;
   generating a virtual configuration state on the computing device based at least in part on the first configuration state of the computing device;
   determining a first modification to be made to the first configuration state based at least in part on a first characteristic of a first application;
   modifying the virtual configuration state to track and correlate any modification made to the first configuration state of the computing device based at least in part on the determined first modification; and
   modifying the first configuration state of the computing device at a second time after the first time based at least in part on the determined first modification,
   wherein the virtual configuration state comprises instructions to rollback the modified first configuration state to the first configuration state.

2. The method of claim 1, further comprising:
   determining a second modification to the first configuration state based at least in part on the first application.

3. The method of claim 2, further comprising:
   modifying the first configuration state based at least in part on the second modification.

4. The method of claim 2, wherein the second modification comprises:
   uninstalling the first application.

5. The method of claim 2, wherein the second modification comprises:
   updating the first application.

6. The method of claim 2, further comprising:
   modifying the first configuration state based at least in part on the second modification and the original virtual configuration state or the modified virtual configuration state.

7. The method of claim 1, wherein modifying the virtual configuration state comprises:
   dynamically modifying the virtual configuration state based at least in part on modifying the first configuration state at the second time.

8. The method of claim 1, wherein modifying the virtual configuration state comprises:
   statically modifying the virtual configuration state based at least in part on the first characteristic of the first application.

9. The method of claim 1, wherein modifying the first configuration state comprises:
   modifying a system file.

10. The method of claim 1, wherein the first modification comprises:
    installing the first application.

11. The method of claim 1, wherein the first modification comprises:
    updating the first application.

12. The method of claim 1, wherein the first characteristic of the first application comprises:
    a method of the first application influencing a setting.

13. The method of claim 12, wherein the setting comprises:
    any of a device setting, or an application setting, or a combination thereof.

14. The method of claim 12, wherein the setting comprises:
    any of a connectivity setting, or a localization setting, or a display setting, or an audio setting, or a storage setting, or an input setting, or a combination thereof.

15. A computing device for managing electronic device configuration, comprising:
    a processor;
    memory in electronic communication with the processor, wherein the memory stores computer executable instructions that when executed by the processor cause the processor to perform the steps of:
      identifying a first configuration state of the computing device at a first time;
      generating a virtual configuration state on the computing device based at least in part on the first configuration state of the computing device;
      determining a first modification to be made to the first configuration state based at least in part on a first characteristic of a first application;
      modifying the virtual configuration state to track and correlate any modification made to the first configuration state of the computing device based at least in part on the determined first modification; and modifying the first configuration state of the computing device at a second time after the first time based at least in part on the determined first modification, wherein the virtual configuration state comprises instructions to rollback the modified first configuration state to the first configuration state.

16. The computing device of claim 15, the instructions further comprising:

determining a second modification to the first configuration state based at least in part on the first application.

17. The computing device of claim 16, the instructions further comprising:

modifying the first configuration state based at least in part on the second modification.

18. The computing device of claim 15, wherein modifying the virtual configuration state comprises:

dynamically modifying the virtual configuration state based at least in part on modifying the first configuration state at the second time.

19. The computing device of claim 15, wherein the first characteristic of the first application comprises:

a method of the first application influencing a setting.

20. A non-transitory computer-readable storage medium storing computer executable instructions that when executed by a processor cause the processor to perform the steps of:

identifying a first configuration state of a computing device at a first time;

generating a virtual configuration state on the computing device based at least in part on the first configuration state of the computing device;

determining a first modification to be made to the first configuration state based at least in part on a first characteristic of a first application;

modifying the virtual configuration state to track and correlate any modification made to the first configuration state of the computing device based at least in part on the determined first modification; and modifying the first configuration state of the computing device at a second time after the first time based at least in part on the determined first modification, wherein the virtual configuration state comprises instructions to rollback the modified first configuration state to the first configuration state.

* * * * *